US006363576B1

(12) United States Patent
Hsu et al.

(10) Patent No.: US 6,363,576 B1
(45) Date of Patent: Apr. 2, 2002

(54) JOINT DEVICE FOR COUPLING A COVER WITH A SCANNER BODY

(75) Inventors: Te-Jung Hsu, PuTzu; Jih-Yung Lu, SanChung, both of (TW)

(73) Assignee: Acer Peripherals, Inc., TaoYuan (TW)

( * ) Notice: Subject to any disclaimer, the term of this patent is extended or adjusted under 35 U.S.C. 154(b) by 0 days.

(21) Appl. No.: 09/613,574

(22) Filed: Jul. 11, 2000

(30) Foreign Application Priority Data

Jul. 28, 1999 (TW) ........................................ 88212620 U

(51) Int. Cl.[7] .............................. E05D 7/06; E05D 7/10
(52) U.S. Cl. ............................. 16/239; 16/266; 16/267
(58) Field of Search .......................... 16/239, 241, 266, 16/267, 268, 374; 399/380; 355/75; 358/497

(56) References Cited

U.S. PATENT DOCUMENTS

| 4,403,856 A | * | 9/1983 | Torto et al. ................... 355/75 |
|---|---|---|---|
| 4,598,889 A | * | 7/1986 | Remington ................... 16/260 |
| 5,231,732 A | * | 8/1993 | Knoop et al. .................. 16/267 |
| 5,265,310 A | * | 11/1993 | Ichinokawa ................... 16/266 |
| 5,441,167 A | * | 8/1995 | Shigeru ....................... 16/374 |
| 5,544,595 A | * | 8/1996 | Stephenson, III et al. ..... 16/374 |
| 5,812,285 A | * | 9/1998 | Lin et al. ..................... 358/497 |
| 5,979,016 A | * | 11/1999 | Fan ............................. 16/267 |

FOREIGN PATENT DOCUMENTS

JP          6-167838        *   6/1994

* cited by examiner

Primary Examiner—Chuck Y. Mah
(74) Attorney, Agent, or Firm—Troxell Law Office PLLC

(57) ABSTRACT

A joint device for coupling a cover with a body of a scanner. The joint device has a pivot means to enable the cover be lifted upward to a height desired according to the thickness of the scanning document. The pivot means has inner walls closed to the interior of the scanner so that outside dusts and dirts won't seep into the scanner. Scanner mechanism may be prevented from contamination and may maintain high scanning quality. The pivot means is simply structured with fewer materials and may be made at less time and low cost.

10 Claims, 12 Drawing Sheets

JOINT DEVICE FOR COUPLING A COVER WITH A SCANNER BODY

BACKGROUND OF THE INVENTION

1. Field of the Invention

This invention relates to a joint device for coupling a cover with a scanner body and particularly to an improved joint device that has a pivot means to enable the cover to turn for open or close smoothly and that may be made with less material and cost.

2. Description of the Prior Art

Scanner is a widely used computer peripheral device nowadays. With explosive growth of computer utilization and continuous drop of computer price, how to keep the cost and price of the scanner low while still maintain sufficient function and quality becomes a great challenge to scanner producers.

For low price scanners now available in the market, they usually have a joining device for coupling the cover of the scanner with the scanner body. One of the such joining devices is fixing one edge of the cover to one side of the body like a hinge. When in use, another edge of the cover that is free may be lifted to turn about the hinged edge for open or close the cover. While it may function well for one page or thin document, it is awkward for scanning a thick document such as a book. In such a situation, the cover will be inclined slantly and not fully cover the scanning surface. Scanning light cannot be distributed evenly, and outside light source may create further light distribution problem on the scanning surface and results in poor scanning quality.

In order to resolve the aforesaid problem, a number of solutions have been introduced in the market place. One of such examples is to divide the cover in two or more foldable and hinged sections. The cover may be flexibly lifted to a height desired to suit different document thickness. Such structure will increase cost. For low price scanner, the foldable sections generally are limited to two. Its functional improvement is also limited.

Another conventional example is shown in FIGS. 1 and 2. The scanner body 1 has a plurality of pivot sockets 10 provided at a side wall 14 of the scanner. At the top surface of the body 1, a transparent board 12 is provided for supporting scanning document. The cover 2 mainly includes a cover plate 22 and a plurality of pivot means 20 located thereunder engageable with the pivot sockets 10. Each of the pivot means 20 has a pair of spaced legs 24 extended downward from the bottom of the cover plate 22 and joined by a foot 25 at the distal ends thereof. Below the foot 25, there is a stopper 26 fixedly located thereunder. Each of the pivot sockets 10 includes a pair of spaced upper openings 110 at the top and a pair of spaced slots 116 formed thereunder for accommodating the legs 24. In the pivot socket 10, there is a gap 113 which enable the foot 25 to pass through. For assembly, the pivot means 20 is held at a selected angle to enable the foot 25 to pass through the gap 113, then the cover 2 is turned to horizontal to lay upon the scanner body 1.

The pivot socket 10 further has a stop tongue 112 and a stop foot 115 located respectively above and below the gap 113 for preventing the pivot means 20 from disengaging with the pivot socket 10 when the cover 2 is horizontally laid on the scanner body. Inside the pivot socket 10, there is a through slot 114 formed in the inside wall of the socket 10. When in use, the stopper 26 is inserted in the through slot 114 which serves as a guard to limit the stopper 26 tilting position so that the cover 2 may be lifted and tilted to an angle desired. As the pivot socket 10 has ample interior space to allow the foot 25 moving up or down, the cover 2 may be held horizontal over the transparent board 12 even for scanning a thick document.

However it creates new problems. The through slot 114 must be formed in the inside wall of the pivot socket 10 to accommodate the stopper 26. It exposes scanner inside mechanism to ambient environment. The scanner mechanism may easily be contaminated by dusts and dirts seeping through the through slot 114 and results in downgrade of scanning quality or even scanner malfunction.

SUMMARY OF THE INVENTION

It is therefore an object of this invention to provide a joint device that has an improved pivot means which is simply structured and may prevent scanner inside mechanism from contamination by external dusts and dirts.

The joint device according to this invention includes at least one pivot socket located at a top portion of a side wall of the scanner body. The pivot socket has a pivot shaft located in a trough formed in the side wall. The trough has closed inner walls without communicating with interior of the scanner body. The pivot shaft has substantially rectangular crosssection with round corners and being shaped with two parallel flat upper and lower surfaces bordered by two curved side surfaces. The pivot socket further has a stopping flange extending from the top wall of the scanner body and above the trough.

The scanner cover has at least one engaging member located below a side edge for pivotally engaging with the pivot shaft. The engaging member looks like a narrow section of a rectangular duct but with a curved lower portion and a side slot at a side wall for the pivot shaft to pass therethrough.

When in use, the pivot shaft is pivotally housed in the engaging member which may be moved up or down so that the cover may also be moved up or down according to thickness of the scanning document. The cover may be kept horizontal against the scanning board to obtain best possible scanning quality. The engaging member may be turned about the pivot shaft smoothly at a selected angle during scanning operation. As the pivot socket does not lead to inside of the scanner body, scanning mechanism won't be contaminated by outside dusts and dirts. Scanning quality may be maintained at high level even after long time of use.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

This invention offers an improved joint device for coupling a cover with a scanner body that has simpler structure to reduce production time and cost.

Figure 1:
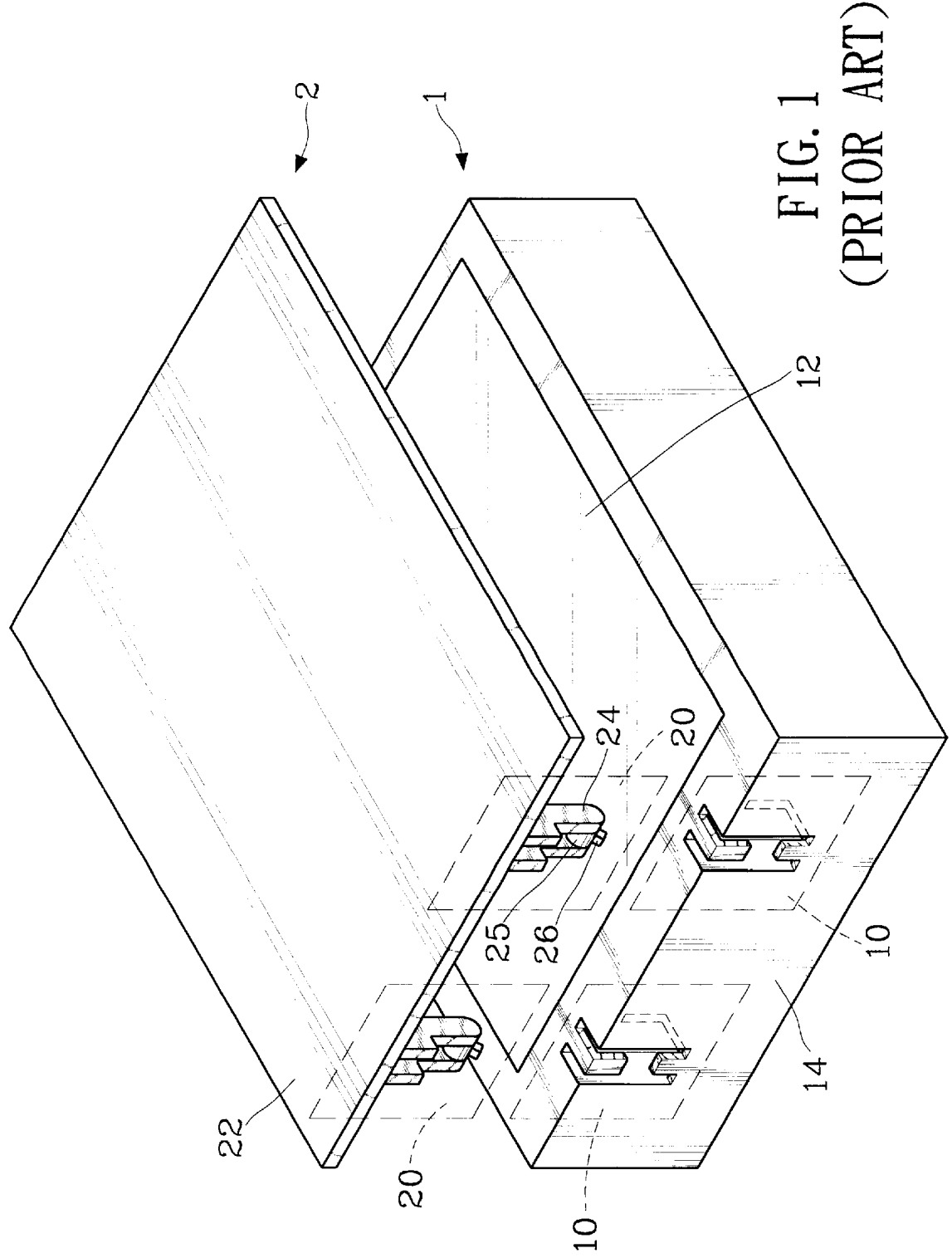
FIG. 1 is an exploded perspective view of a conventional joint device for coupling a cover with a scanning body.
Figure 2:
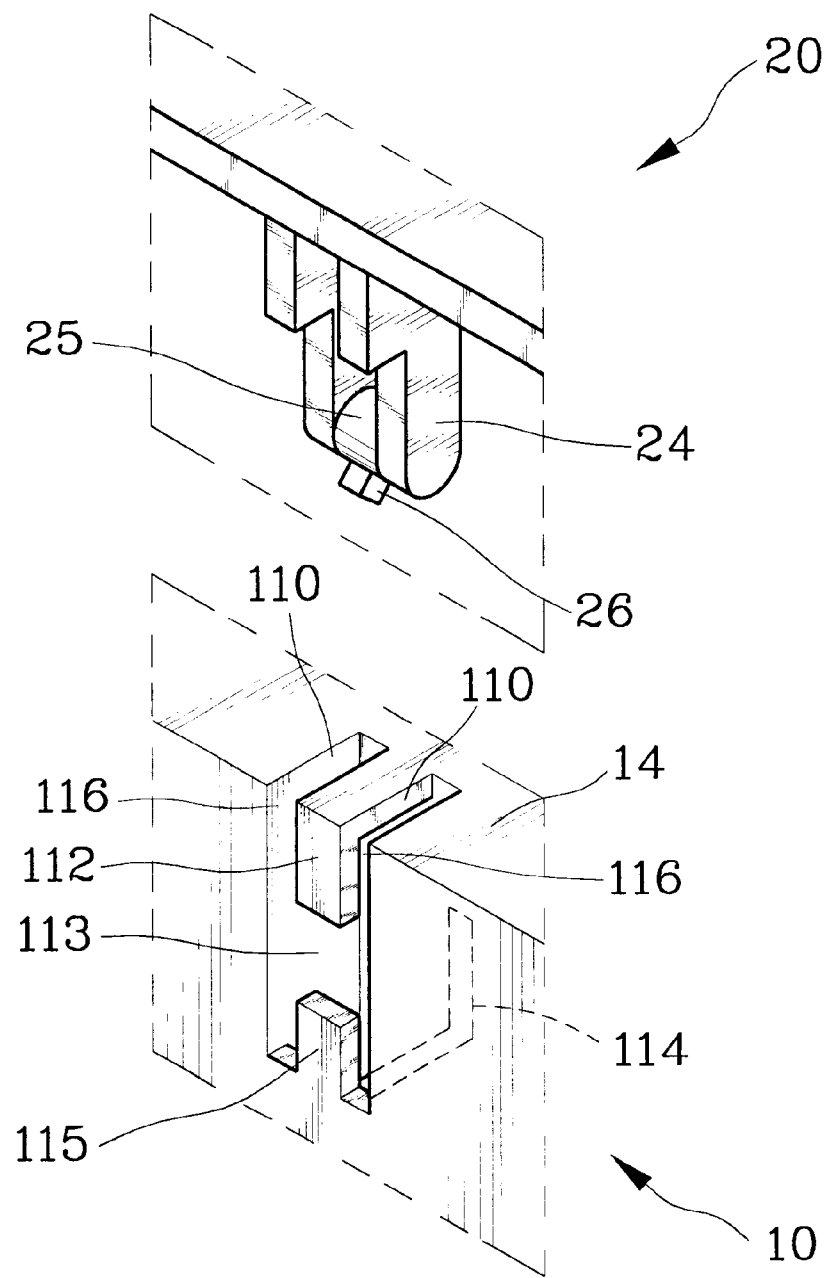
FIG. 2 is an enlarged perspective view of the joint device shown in FIG. 1.
Figure 3:
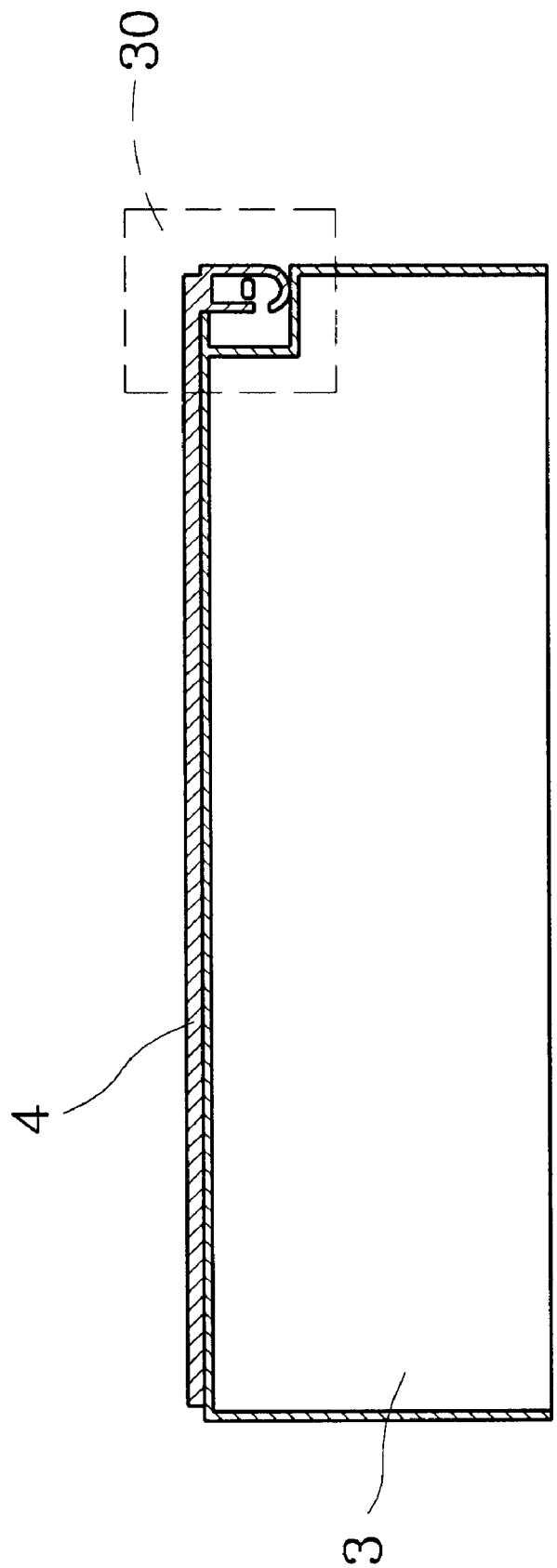
FIG. 3 is a schematic sectional view of a scanner using this invention.

FIG. 3 illustrates the joint device according to this invention that includes a pivot means 30 located at a juncture of one side edge of the scanner cover 4 and one side wall of the scanner body 3.

Figure 4:
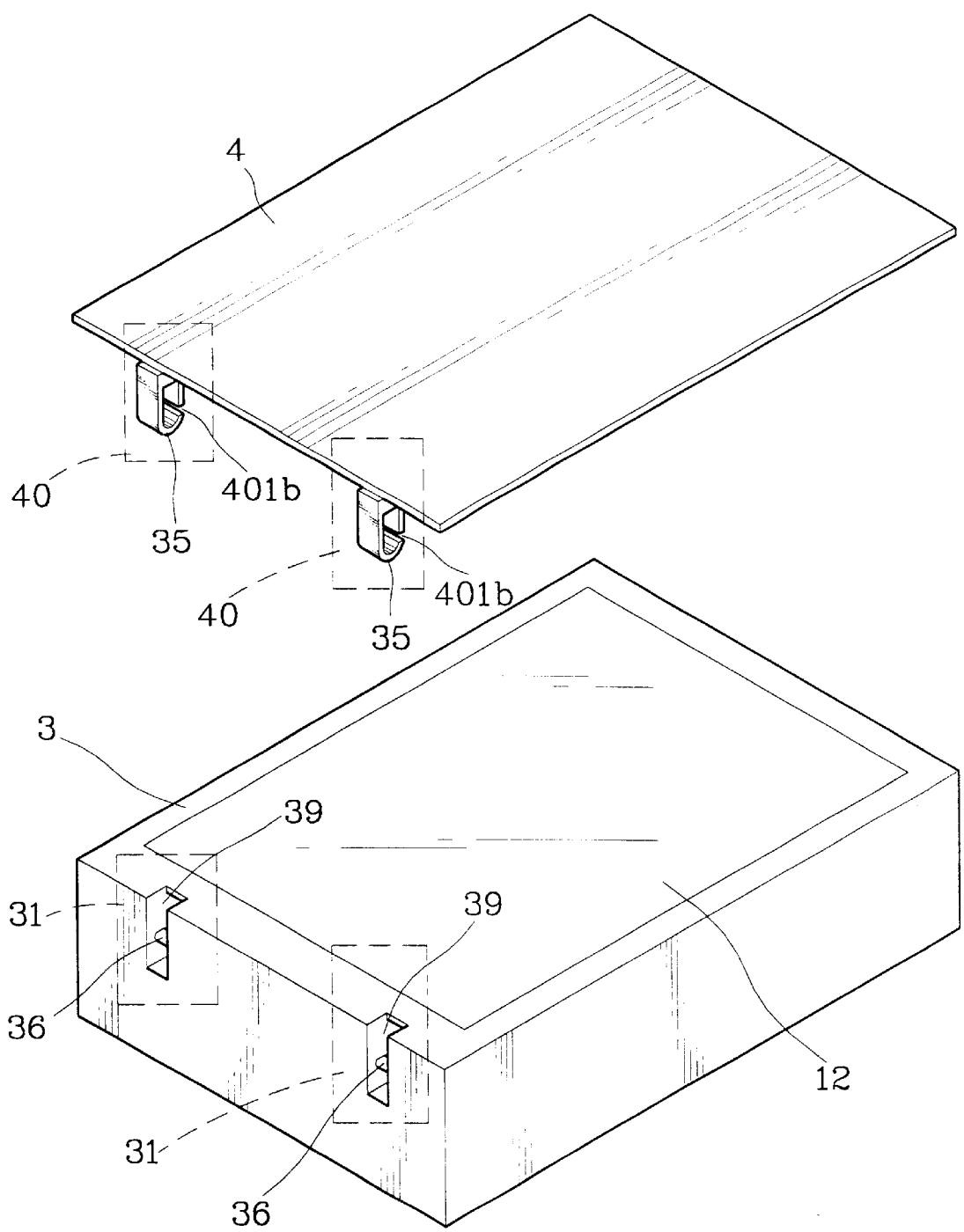
FIG. 4 is an exploded perspective view of this invention.

FIG. 4 shows more details of the pivot means 30. On a side wall of the scanner body 3, there is at least one pivot socket 31 (two are shown in FIG. 4) which includes a trough 39 which has closed inner walls indented into the scanner body 3 and a pivot shaft 36 held transversely in the trough 39.

At one side edge of the cover 4, there is at least one engaging member 40 attached thereunder. The engaging member 40 is shaped like a narrow section of a hollow rectangular duct but with a curved lower portion 35 and a side slot 401b formed in a side wall. The engaging member 40 is engageable with the pivot shaft 36 through the side slot 401b for nesting the engaging member 40 in the trough 39.

Figure 5A:
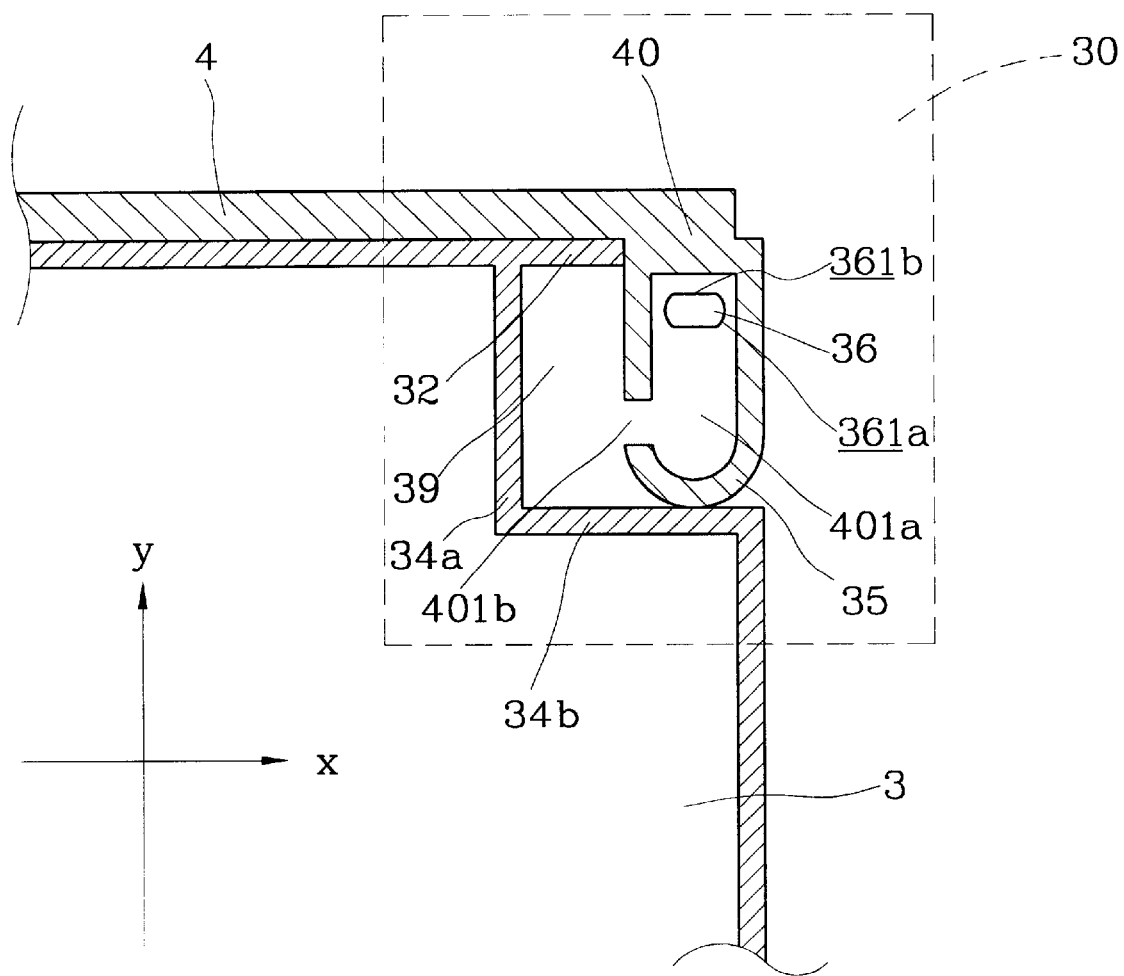
FIG. 5A is a sectional view of a first embodiment of this invention.
Figure 5B:
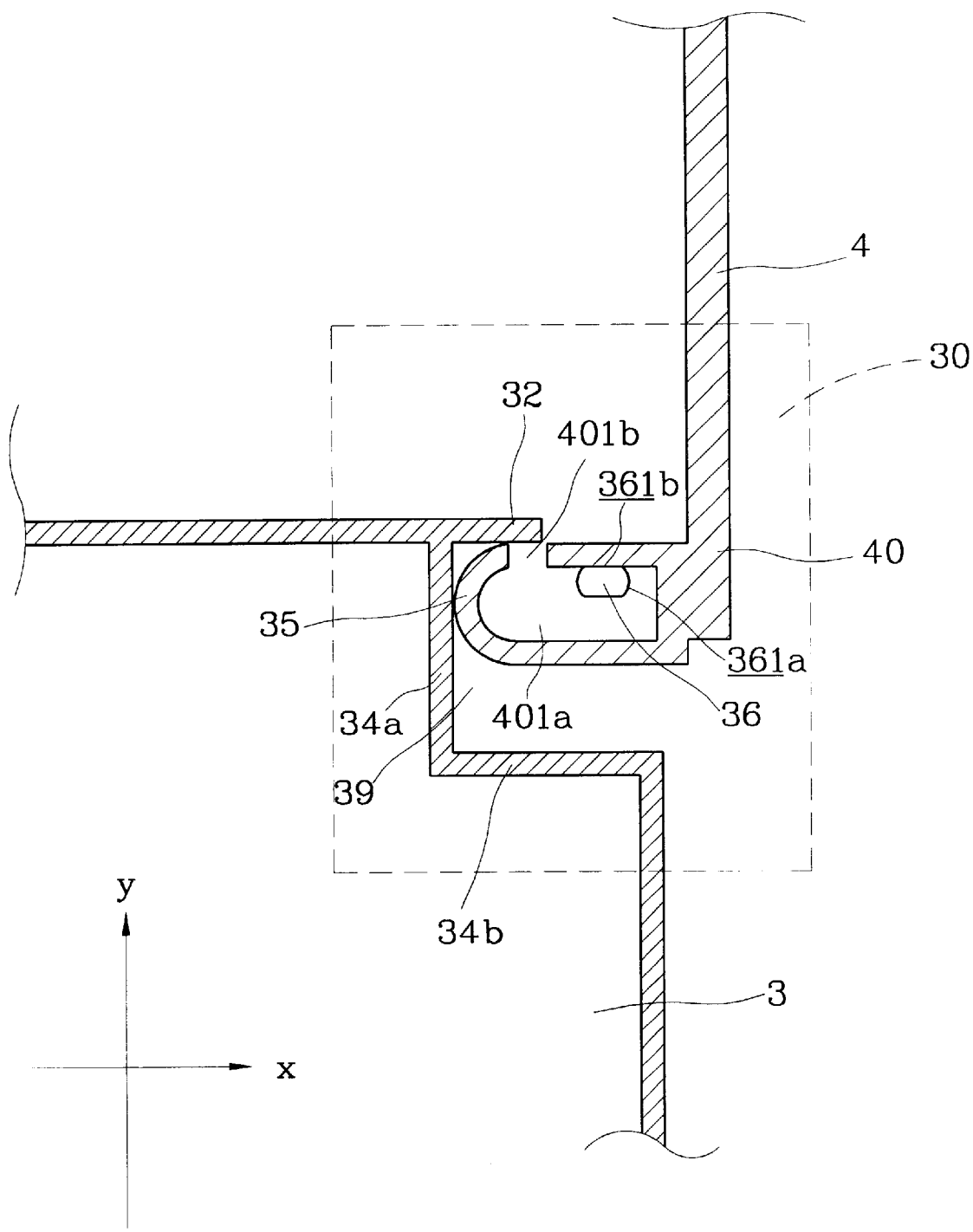
FIG. 5B is another sectional view of the first embodiment shown in FIG. 5A, with the cover lifted.

FIGS. 5A and 5B show a first embodiment of this invention. The pivot socket 31 is located at an upper portion of a side wall of the scanner body 3. It includes a trough 39 which has a side and a top opening, a vertical inner wall 34a and a horizontal inner wall 34b. At the top of the socket body 31, there is a stopping flange 32 extending horizontally from the top wall of the scanner body. In the trough 39, there is a pivot shaft 36 engaged with two side walls of the trough 39. The pivot shaft 36 is shaped like a rectangular bar with two parallel top and bottom walls 361b but with two curved side walls 361a. The thickness between the walls 361b is less than that of the side walls 361a.

The engaging member 40 is shaped like a narrow rectangular hollow duct extending downward from a bottom surface of one side of the cover 4. However the lower portion of the duct is formed in a curved slide surface 35 and there is a slide slot 401b formed in a side wall that is slightly wider than the thickness between the walls 361b of the pivot shaft 36 and smaller than the thickness between the walls 361a. The engaging member 40 forms an inside space 401a much larger than the crosssection of the pivot shaft, especially in the vertical direction.

For assembly, the side slot 401b is wedged against the pivot shaft 36 to have the pivot shaft 36 slipping into the hollow space 401a of the engaging member 40. When the cover 4 is resting on the scanner body 3, the slide surface 35 makes contact with the horizontal inner wall 34b. This is an idle or scanning position. When a thick document is placed upon the scanner for scanning, with cover 4 will be lifted upward. As long as the vertical displacement of the hollow space of the engaging member 40 is greater than document thickness, the cover 4 may remain substantially horizontal to fully cover the scanning board 12 (also shown in FIG. 4) for obtaining high quality scanning results. As the pivot shaft 36 is located at a different height level against the side slot 401b, the engaging member 40 may be securely held without disengaging from the pivot means 30 through the side slot 401b.

When the cover 4 is lifted and turned (as shown in FIG. 5B), the cover 4 will be turned about the pivot shaft 36. The slide surface 35 slides over the horizontal and vertical inner wall smoothly until the side slot 401b is located hitting the stopping flange 32 and the side surface 35 is located hitting the vertical inner wall 34a. At this point, the cover 4 will be stopped for further turning. Depending on the angle of the side wall of the engaging member 40 which is formed by modulating the slide surface 35, the stopping flange 32 and the vertical inner wall 34, the cover 4 may be lifted and turned to an angle desired (the FIG. 5B, example shows about a 90 degree angle). It also helps to reduce cover damage which might otherwise happen when the cover 4 is swung non-stop abruptly.

Since the length between the curved surfaces 361a is greater than the width of the side slot 401b, the pivot shaft 36 will not slip out of the side slot 401b during the cover lifting and turning operation.

As the inner walls 34a and 34b and side walls of the trough 39 is closed not to expose the interior of the scanner, dusts and dirts won't be seeped into the scanner. This further enhances scanning quality and reduces machine down frequency. It may result in lower operation and maintenance cost.

Figure 6A:
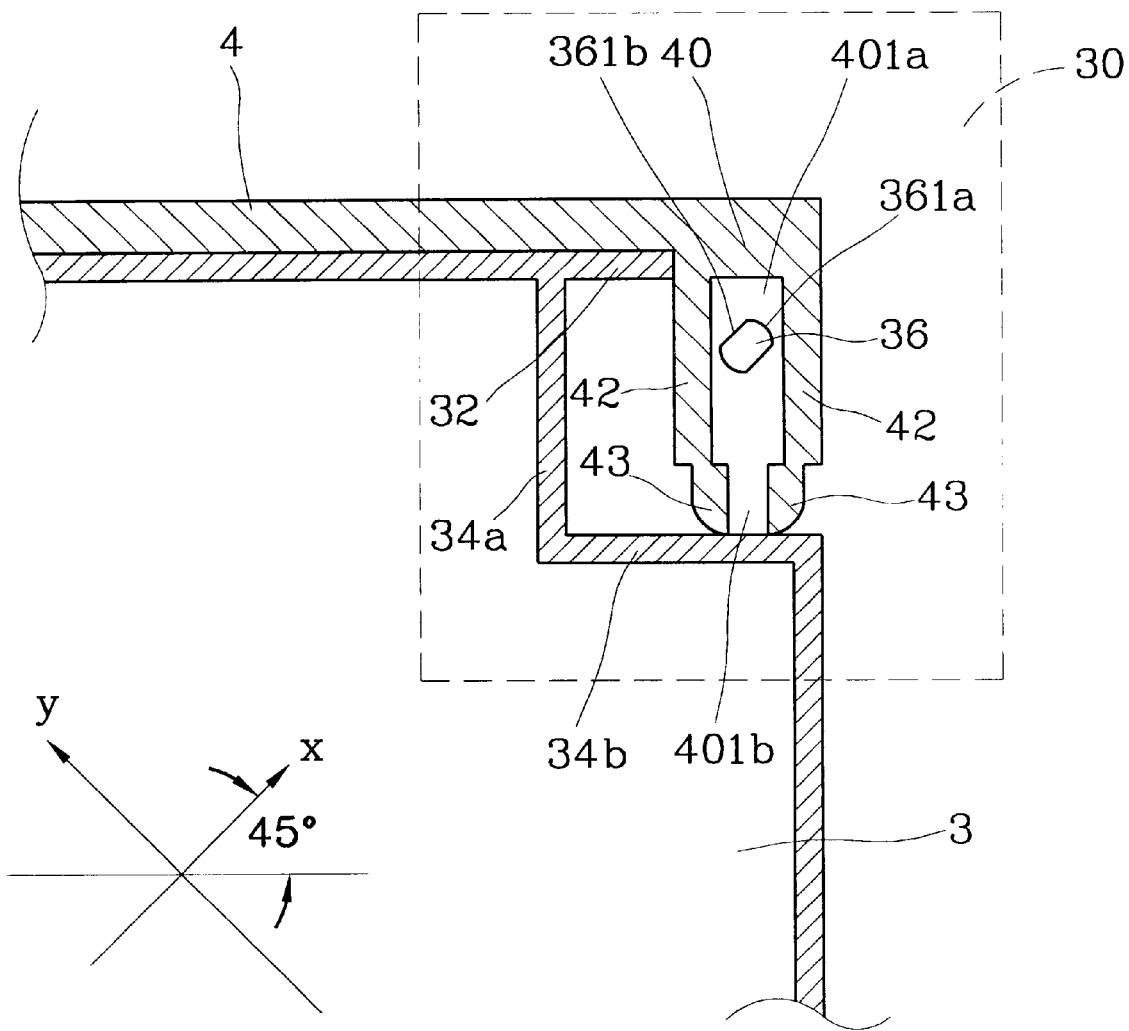
FIG. 6A is a sectional view of a second embodiment of this invention.
Figure 6B:
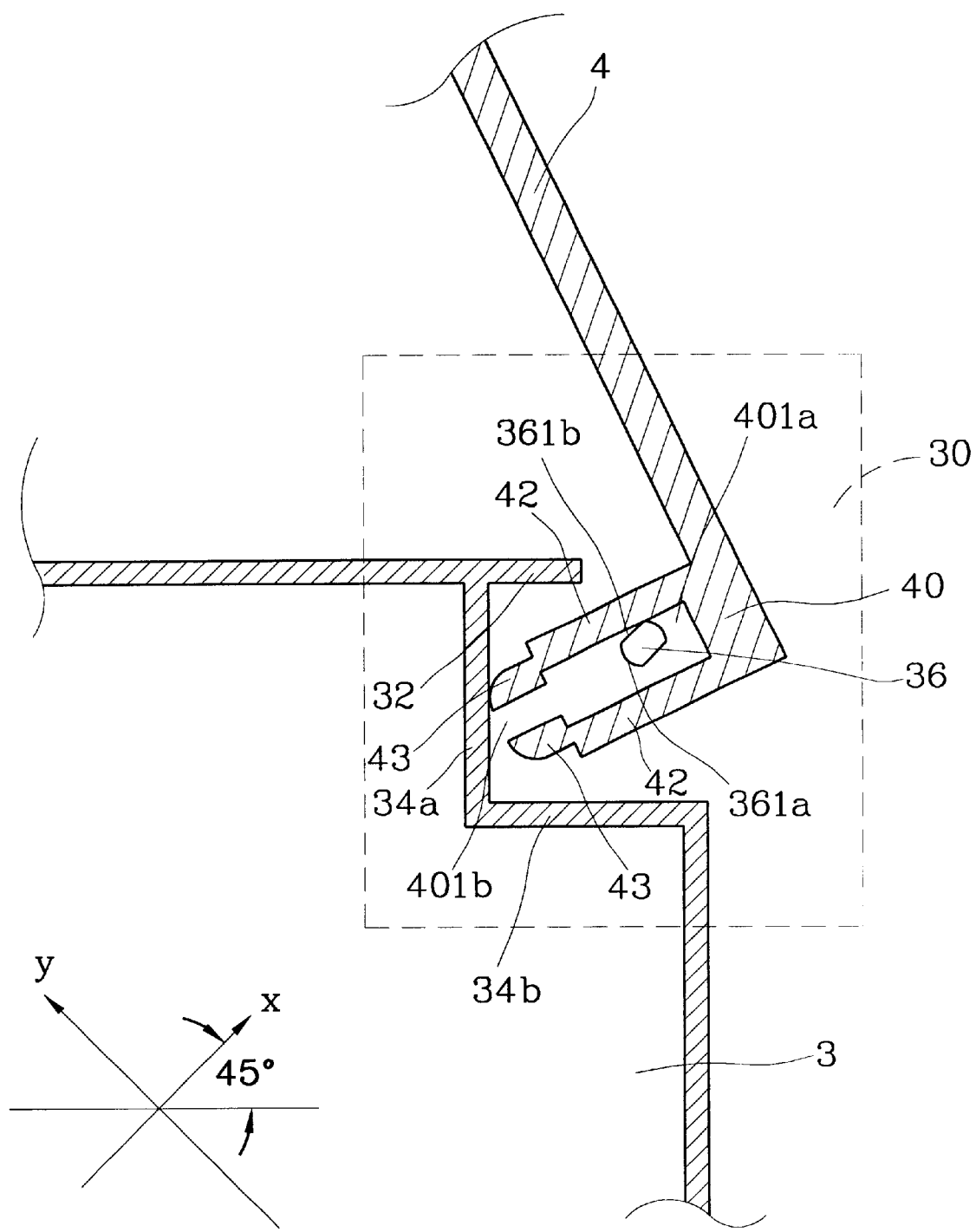
FIG. 6B is another sectional view of the second embodiment shown in FIG. 6A.

FIGS. 6A and 6B illustrate a second embodiment of this invention. It is constructed like the one shown in FIG. 5A. Similar components will be marked by similar numerals. The engaging member 40 is formed like a reversed "U" shape but with a narrower and step lower portion which formed a slide surface 43. The slot 401b is located at the bottom instead in a side wall. The pivot shaft 36 is skewed a selected angle crosssection wise. In the FIG. 6A, the skewed angle is 45 degree against a horizontal axis. This arrangement allows the engaging member 40 to engage with the pivot shaft 36 only at the selected angle and makes the disengagement between the cover 4 and the body 3 during scanning operation even more unlikely.

In the aforesaid two embodiments, the crosssection of the pivot shaft 36 is not circular. It has a larger dimension in X-axis and smaller dimension in Y-axis. The X-Y axes need not be horizontal and vertical. FIG. 5A shows X-axis is horizontal (with zero degree of skewed angle), and Y-axis is vertical (skewed angle is ninety degree). FIG. 6A shows the skewed angle is 45° for X-axis and 135° for Y-axis.

The pivot shaft 36 has a smaller dimension along the Y-axis (i.e. 135° skewed angle) and a larger dimension along the X-axis (i.e. 45° skewed angle). Hence when the slot 401b of the engaging member 40 is turned at the X-axis, the pivot shaft 36 may pass through the slot 401b to enable the engaging member 40 be engaged or disengaged with the pivot shaft 36. Turning the slot 401b other than the X-axis, the pivot shaft 36 may not pass through slot 401b, then the engaging member 40 may be hinged with the scanner without breaking away.

Figure 7A:
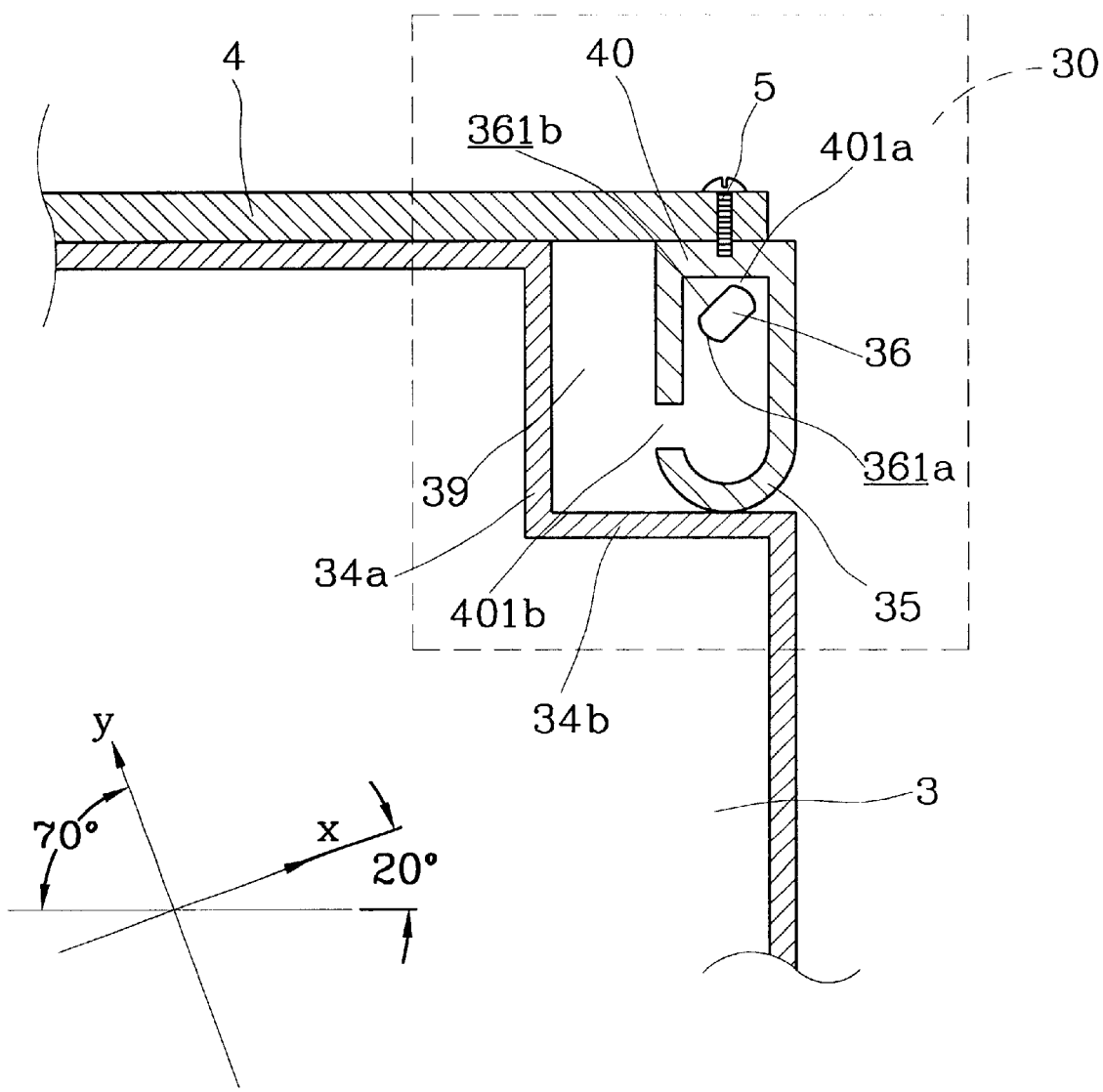
FIG. 7A is a sectional view of a third embodiment of this invention.
Figure 7B:
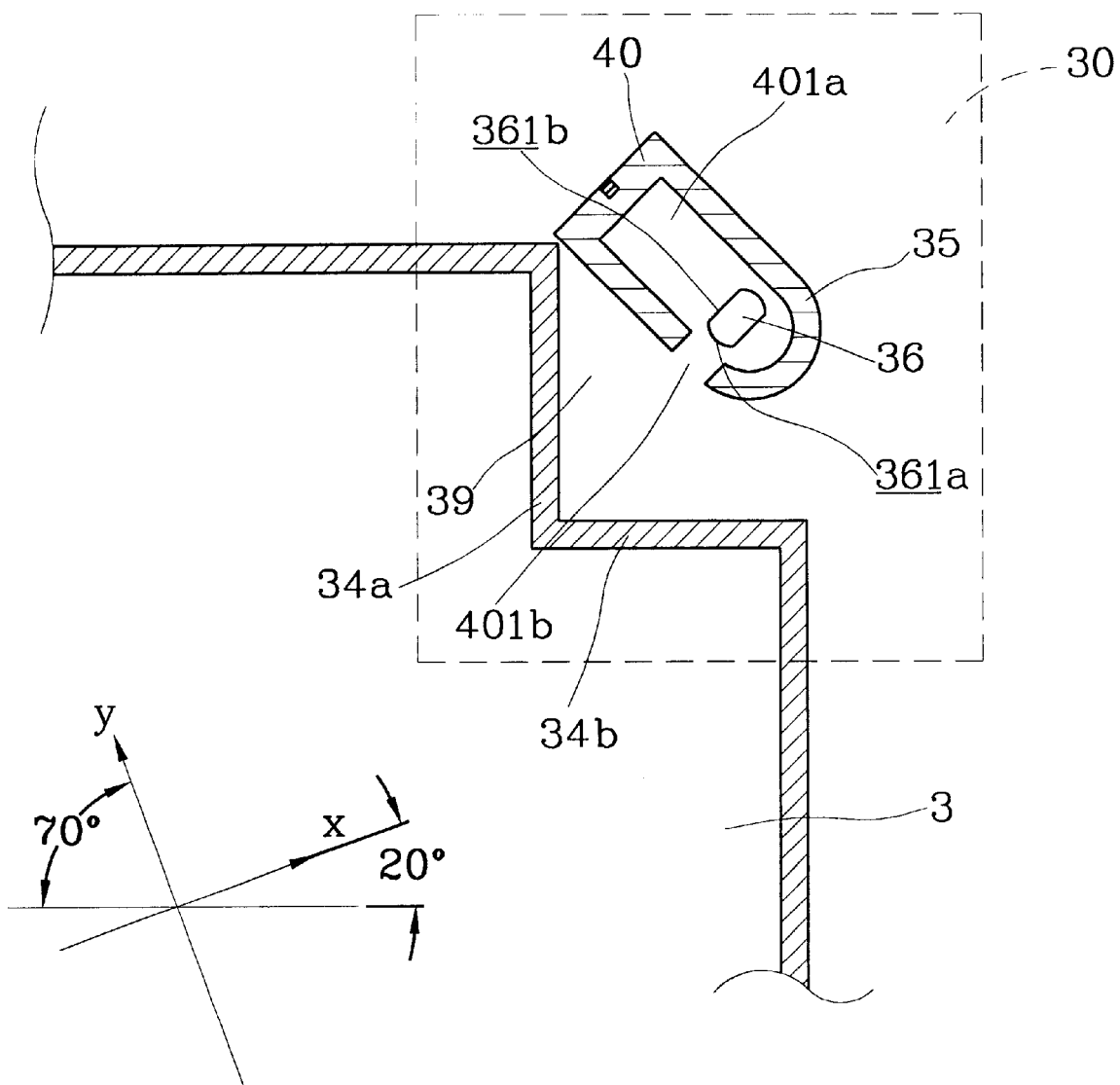
FIG. 7B is a sectional view of the third embodiment of this invention, for assembly the joint device in the scanner.
Figure 7C:
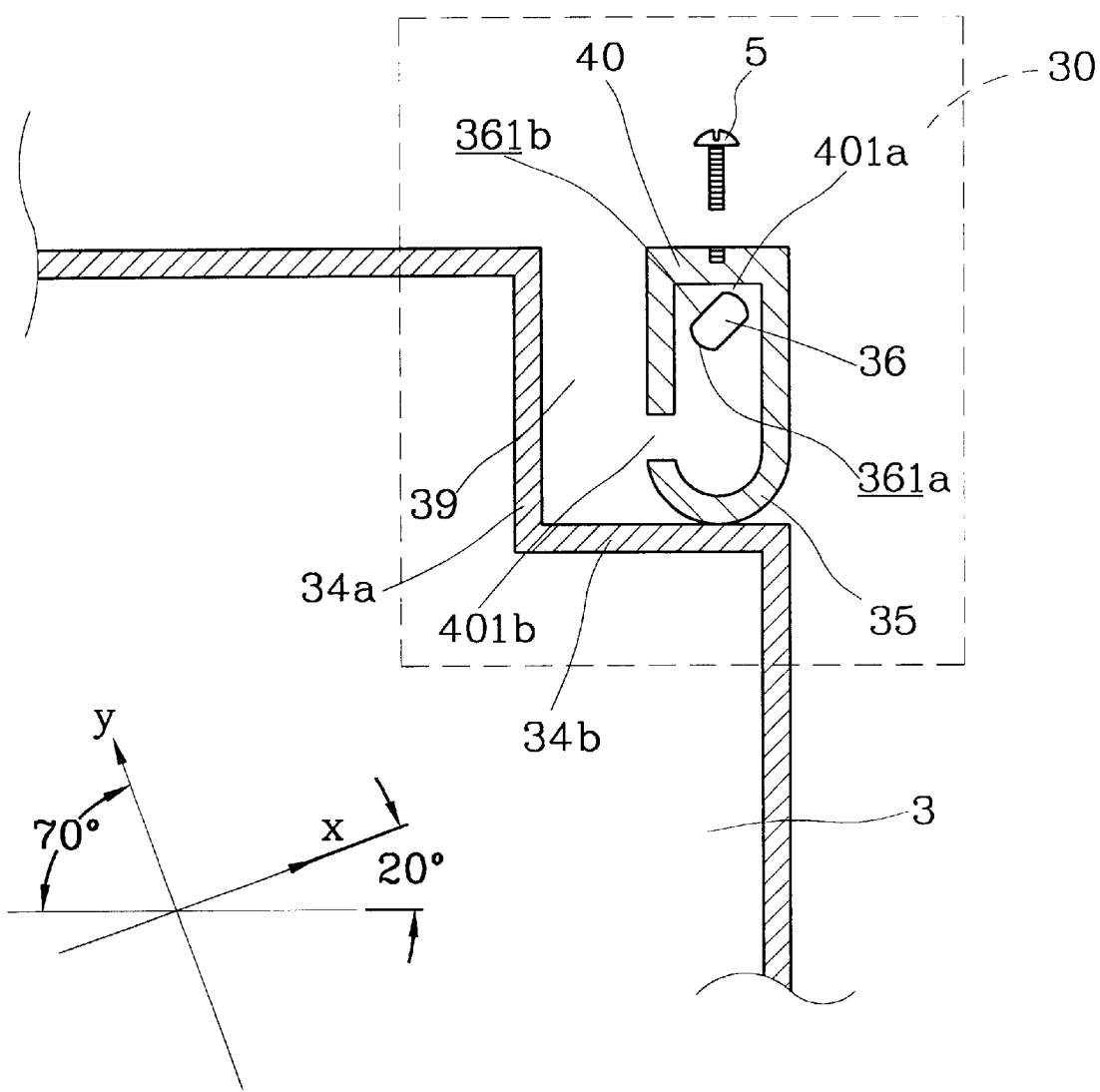
FIG. 7C is a sectional view of the third embodiment of this invention, for installing the scanner cover.
Figure 7D:
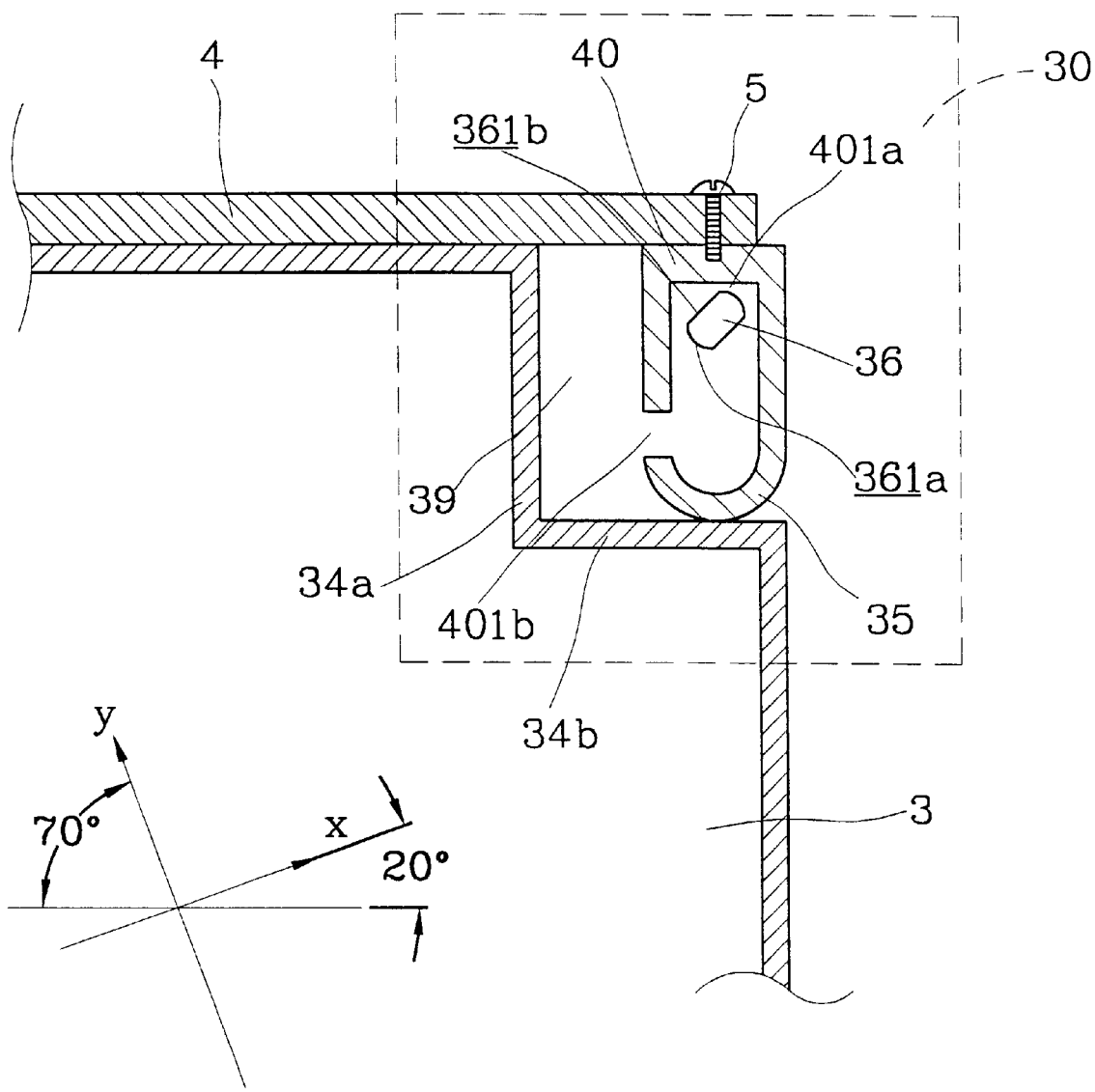
FIG. 7D is a sectional view of the third embodiment of this invention, for completing assembly.

FIGS. 7A and 7B illustrate a third embodiment of this invention. It is substantially a mixed combination of the first and second embodiment set forth above. The engaging member 40 is shaped like the one shown in FIG. 5A but is a separate and detachable unit from the cover 4. It is fixed to the cover 4 through a screw 5. The pivot means 30 is largely like the one shown in FIG. 6A but with the pivot shaft 36 skewed 20 degree against the horizontal axis. After the engaging member 40 is skewed and engaged with the pivot shaft 36 (FIG. 7B), the engaging member 40 is held upright for screwing with the cover 4 (FIGS. 7C and 7D). Then whatever angle the cover 4 being lifted and turned, it won't disengage with the pivot shaft 36.

It is to be noted that the pivot shaft 36 is purpose fully having different dimensions in length and width for preventing it from incidentally slipping through the side slot 401b during scanning operation. Other crosssection such as ellipse and irregular polygons may also be used equally well.

It may thus be seen that the object of the present invention set forth herein, as well as those made apparent from the foregoing description, are efficiently attained. While the preferred embodiments of the invention have been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A joint device for pivotally connecting a cover to a scanner body and comprising:
   a) a cover;
   b) a scanner body;
   c) at least one trough in the scanner body bounded by a vertical inner wall joining a horizontal inner wall, and opposite side walls;
   d) a pivot shaft extending transversely across the trough between the opposite side walls, the pivot shaft having flat, parallel top and bottom walls spaced apart a first distance, and curved side walls joining the top and bottom walls, the curved side walls being spaced apart a second distance greater than the first distance; and,
   e) at least one engaging member on the cover, the engaging member having at least a first wall with a curved surface, and a second wall, the first and second walls bounding an inside space and a slot between the first and second walls, the slot having a width greater than the first distance and less than the second distance of the pivot shaft, the pivot shaft being located in the inside space whereby the engaging member is movable pivotally and vertically with respect to the pivot shaft.

2. The joint device of claim 1 wherein the top and bottom sides of the pivot shaft are oriented parallel to the horizontal inner wall.

3. The joint device of claim 1 wherein the top and bottom sides of the pivot shaft are oriented obliquely with respect to the horizontal inner wall.

4. The joint device of claim 3 wherein the top and bottom sides of the pivot shaft are oriented at a 45° angle with respect to the horizontal inner wall.

5. The joint device of claim 3 herein the top and bottom sides of the pivot shaft are oriented at a 20° angle with respect to the horizontal inner wall.

6. The joint device of claim 1 wherein the first wall has a "J" shaped cross-sectional configuration with a curved slide surface.

7. The joint device of claim 1 wherein both first and second walls have curved slide surfaces and wherein the slot is located between the curved slide surfaces.

8. The joint device of claim 1 wherein the at least one engaging member is formed integrally with the cover.

9. The joint device of claim 1 wherein the at least one engaging member is attached to the cover by a mechanical fastening device.

10. The joint device of claim 1 further comprising a stopping flange extending outwardly from the vertical inner wall.

* * * * *